US005089329A

United States Patent [19]

de Vrieze et al.

[11] Patent Number: 5,089,329

[45] Date of Patent: Feb. 18, 1992

[54] EXPANDABLE TAPE FOR CABLES, THE USE THEREOF, AND CABLES

[75] Inventors: Roelf R. A. de Vrieze, Veenendaal; Petrus G. J. Vogel, Arnhem, both of Netherlands

[73] Assignee: Union Industrial Y. A., RG Venendel, Netherlands

[21] Appl. No.: 130,496

[22] Filed: Dec. 9, 1987

[30] Foreign Application Priority Data

Dec. 11, 1986 [NL] Netherlands ........................ 8603154
Jul. 3, 1987 [NL] Netherlands ........................ 8701570

[51] Int. Cl.[5] ........................ B32B 3/26; C08J 9/00; H01B 7/00

[52] U.S. Cl. ................................ 428/313.5; 174/107; 174/110 SR; 174/110 F; 174/120 SR; 174/121 A; 174/121 SR; 428/147; 428/240; 428/260; 428/265; 428/283; 428/313.3; 428/327; 428/377; 428/373; 521/56; 521/57; 521/76; 521/58

[58] Field of Search ............... 428/147, 240, 260, 295, 428/327, 351, 373, 377, 313.3, 313.5, 265, 283; 174/110 SR, 110 F, 111, 107, 120 SR, 121 A, 121 SR; 264/DIG. 9; 521/56, 58, 57, 76

[56] References Cited

U.S. PATENT DOCUMENTS

| | | | |
|---|---|---|---|
| 3,558,801 | 1/1971 | Vinnhorst | 174/110 F |
| 3,681,510 | 8/1971 | Lenleux | 174/110 F |
| 4,269,638 | 5/1981 | Faranetta et al. | 156/53 |
| 4,320,076 | 3/1982 | Greenwood | 264/35 |
| 4,749,420 | 6/1988 | Phillips et al. | 156/53 |

FOREIGN PATENT DOCUMENTS

| | | |
|---|---|---|
| 2751641 | 11/1977 | Fed. Rep. of Germany . |
| 3048912 | 7/1982 | Fed. Rep. of Germany . |
| 3409364 | 9/1985 | Fed. Rep. of Germany . |
| 3511594 | 10/1986 | Fed. Rep. of Germany . |
| 2011154 | 7/1979 | United Kingdom . |

*Primary Examiner*—George F. Lesmes
*Assistant Examiner*—Christopher Brown
*Attorney, Agent, or Firm*—Cushman, Darby & Cushman

[57] ABSTRACT

This invention relates to an expandable tape for use in making cables. The expandable tape comprises a carrier material carrying thermally expanding microcapsules therein or thereon. The invention also relates to the use of the tape in the manufacture of cables, and to the cables incorporating such tape.

12 Claims, No Drawings

EXPANDABLE TAPE FOR CABLES, THE USE THEREOF, AND CABLES

This invention relates to an expandable tape for use in the manufacture of cables for communication or power transmission, to the use of such expandable tape for the manufacture of cables, and to the cables comprising such an expandable tape.

Cables for communication purposes are at present to be divided into two groups, namely, standard cables with copper conductors and glass fibre cables.

The core of a standard communication cable is built up from a bundle of thin insulated copper wires through which signals are sent. Generally speaking, the insulation consists of an extruded synthetic plastics, for example, polyethylene, but it is also possible to use paper. This core is commonly taped with paper, film or textile material, while, depending on the requirements which the cable should satisfy, an extruded inner sheath of polyethylene or a different plastics may be superimposed upon this taping. Subsequently, a protection of aluminium foil may be provided around the extruded inner sheath, around which, finally the extruded outer sheath is put.

Glass fibre cables generally consist of a plurality of glass fibres surrounded by particular structures for protecting the glass fibres from the influences of moisture and deformation. To prevent deformation, the glass fibres are sometimes laid in special channel members having a high tensile strength. To prevent the effect of moisture, the space between the glass fibres is often filled with a water-repellent material, for example, on the basis of petrolate. Around this core, a tape of a synthetic plastics film, such as polyester, may be wound, around which, in turn, a protective layer of high tensile strength is provided. Finally, an outer sheath of a suitable plastic, such as polyethylene, can be applied around the assembly.

Cables for power transmission, and in particular medium-tension and high-tension transmission lines are generally built up around a solid or assembled core of copper or aluminium. If desired, a semi-conductive layer may be applied around this. Provided around that layer is an insulation of rubber or polyethylene, which may or may not be cross-linkable. If necessary, another layer of semi-conductive material is provided around this insulation, which in turn is surrounded by a screen consisting of a plurality of copper or aluminium wires. Finally, an outer sheath of extruded plastics, such as polyethylene, polyvinyl chloride or rubber, is applied around the screen.

In all these kinds of cables, there is the danger that moisture penetrating when the cable sheath is damaged is distributed throughout lengthwise of the cable, thereby adversely affecting the cable characteristics. Countless proposals have already been made to prevent this.

For standard communication cables with insulated copper conductors, the space between the insulated conductors can be rendered longitudinally water-tight by filling the core with a mass on the basis of petrolate, but it is also possible for the insulation of the leads to be provided with short fibres of a water-absorbent material, or the core can be filled discontinuously with a rubber composition, for example, on the basis of silicones. Particular measures must be taken to provide a good longitudinal water-tightness under an extruded inner sheath or, if present, a layer of polyester film. If an aluminium screen is present, there is, in addition, between the aluminium screen and the inner sheath, or polyester film, a space which causes poor longitudinal water-tightness.

In cables filled with a composition on the basis of petrolate (petroleum jelly), such as standard communication cables on the basis of copper conductors, or glass fibre cables, the problem may occur that, as a result of shrinkage which takes place during production or expansion as a result of temperature change of the cable, spaces are formed which are not filled with the mass (contraction cavities). Especially in case these cavities extend through longer distances in the cable, moisture will readily penetrate a longer length into the cable when the outer sheath is damaged.

In the case of power transmission cables, when the cable is damaged the screen may be the cause that the cable is inundated over a very long length, because there is a large hollow space between the screen wires. It has already been proposed to apply a tape around the cable under the outer sheath, which tape is provided with a material which swells in water. As soon as water finds its way into the cable, this material is activated and expands. As a result of this expansion, the damage is, as it were, isolated from the surroundings, and water cannot penetrate any further.

Such a tape may also be suitable for water-proofing communication cables.

Although this gave a clear improvement for preventing the moisture problem in cables, there was yet the disadvantage that the water-swelling material needed a short time to be activated, so that the water was still able to penetrate some length into the cable before the tape became active.

The filling-up activity may sometimes be limited by the expandable material being washed out, while the degree of swelling may also be affected by bivalent or polyvalent ions from the water.

It is an object of the present invention to provide an expandable tape which does not have this disadvantage. The expandable tape according to the present invention, for use in the manufacture of cables, comprises a carrier material carrying thermally expanding microcapsules therein or thereon. The expandable tape according to the invention can be applied over the core, or under the outer sheath, and when the inner sheath or the outer sheath is extruded, the heat from the extruded mass will cause the thermally expandable microcapsules to expand as soon as the space for this is locally available, and thus compensate for any volume contraction which may occur in the core through adequate temporary overpressure in the material.

As, in such a situation, the expandable tape can often come into contact with the filling composition, the tape material itself will also become filled (through pressure or suction) with the filling composition, which has become somewhat liquid under the influence of the heat.

According to the invention, however, it is also possible to provide longitudinal water-proofing between the inner sheath or polyester film and the aluminium screen with the expandable tape by impregnating a heat-expandable tape with the filling composition, or using water-swelling material, too. This latter can be realized either by using one tape to which both materials have been applied, or by using two separate tapes, one with thermally expandable microcapsules, and one with water-swelling material.

Although, with the combination of thermally expandable and water-swelling material, the problem of the activation time is still there to some extent, there is yet a clear improvement as compared with the use of water-swelling material alone, because in the case of superficial damage the thermally expanded tape will localize the water on the outside, so that no water can penetrate the core proper. After a short time, the water-swelling material is then activated and complete sealing is accomplished.

In this connection it is noted that the use of microcapsules or microspheres in power cables has already been described in German Offenlegungsschrift 3,404,488, which publication relates to the use of a composition comprising a petrolate mixed with microcapsules. The cable is filled with the petrolate containing the non-expanded microcapsules, and the microcapsules are subsequently caused to expand. Certainly in the case of more complicated cables, it is rather difficult to achieve a good, uniform and reproducible admixture of microcapsules, while also particular measures are required to expand all microcapsules. The most important difference from the present invention is, however, that these microcapsules are used to influence the dielectric constant of the petrolate and not to provide longitudinal water-proofing. Indeed, the use of the microcapsules in the manner described in the German publication does not solve the problems outlined hereinbefore.

Another proposal for the use of microcapsules is described in German patent application 3,409,364, and comprises applying microcapsules to the surface of the insulation. This use of microcapsules, too, provides for insufficient longitudinal water-proofing.

In this connection it is noted that the expandable tape according to the present invention is a material which must be separately incorporated in the cable, and is incomparable with an electric insulation fixedly extruded around a conductor.

Although the expandable tape described above is very satisfactory in many uses, it has been found that further improvement is possible.

For a uniform expansion of the microcapsules present, there must be a sufficient contact with the heat source, i.e. the extruded sheath. In a telecommunication cable, for example, in which the surface of the core, in cross-section, is too different from the circular shape, the tape will sometimes tend to stick in the grooves of the core, especially if it is longitudinally introduced, so that there is insufficient surface-to-surface contact with the outer layers, and the poorer heat conduction will result in non-uniform or insufficient expansion. In some cases, expansion will locally even fail to occur altogether. It has been found that in such cases the cable is less water-proof in longitudinal direction, which can be explained from the fact that no expansion occurs where it is most needed, namely, at the grooves present in the core.

In the case of cable constructions (for example, a glass fibre cable laid with some space in an outer tube), a tape must be used which after expansion has a larger thickness (2–4 mm). If that tape is to be expanded by means of extrusion heat, a problem arises with the transport of heat in the diametrical direction of the tape. The side of the tape facing the heat source will expand, and it is this very expansion which will build up a high heat resistance. The tape will thus insulate itself, and no expansion or a poor expansion will take place on the other side.

A preferred embodiment of the invention comprises a tape with at least two types of microcapsules thereon. The temperatures at which the two or more types begin to expand are different. A minimum difference of 0.1° C. is necessary, a difference of 2° C. is desirable, and a preferred difference is 5° C. The maximum difference may be, for example, 35° C., and preferably 25° C. Larger differences have the disadvantage that there is going to be a risk of decomposition or collapse of the lower or lowest expanding type.

Preferably, the different types of microcapsules are present in separate layers. This is of importance for ensuring a good operation of the expandable tape.

It is also possible for each type of microcapsules to be separately incorporated in and/or applied to a tape, and for two tapes to be jointly incorporated in the cable.

According to the invention it is also possible, however, to ensure longitudinal water-tightness between the inner sheath or polyester film and the aluminium screen with the expandable tape by impregnating a heat-expandable tape with a filling mass, or using water-swellable material, too. This latter can be accomplished either by using one or two tapes to which both materials have been applied, or by using one or more separate tapes for the thermally expandable microcapsules, and one with water-swellable material.

The expandable tape according to the invention can be made by applying non-expanded microcapsules to a carrier material in a uniform distribution. The carrier material is preferably a fibrous structure, a foamed synthetic plastics, a film of plastics, a foil of metal or paper. In case a fibrous structure is used, this is preferably a woven fabric, a net, knitted fabric, cord or a non-woven web. The raw materials used for the carrier material can be the conventional fibre or film plastics, and it is also possible to use a metal foil, for example, an aluminium foil.

The expandable microcapsules can be applied to the carrier material in a solid field or in all sorts of regular patterns, for example, as dots, lines, bars or figures. When using dots, these can be applied, for example, at random. The only important feature is that the tape surface must be sufficiently covered with expandable capsules, with "sufficient" meaning that after a thermal treatment and expansion of the microcapsules the greater part of the surface of the tape is covered with expanded capsules. The capsules may be applied to the surface or be fully incorporated within the carrier.

The expandable capsules are attached to the carrier material in a conventional manner by means of a conventional binder, for example, of the type of polyacrylate, polyacrylonitrile, halopolyvinyl compounds, polyvinyl alcohol, polyvinyl pyrrolidone, polyester or epoxy. The application of the capsules to the carrier material can be effected in various ways, for example, by impregnation or by printing. When a printing technique is used, a binder dispersion with microcapsules incorporated therein and possibly including a wetting agent and a thickener can be applied to the carrier material by conventional printing techniques. It is also possible for the dispersion to be converted into a stable foam and for the capsules to be applied to, or incorporated into, the carrier using screen printing techniques.

When two types of microcapsules are used, preferably one type is incorporated into the carrier, and one type is applied to it.

The carrier thus provided with microcapsules is subsequently dried, and possibly compressed to the desired thickness. These last two treatments are naturally effected below the temperature at which expansion of the microcapsules occurs.

Suitable microcapsules are, for example, polyvinylidene chloride microcapsules which include a blowing agent, preferably a physical blowing agent.

The dimensions of the thermally expandable tapes, thickness and width, are essentially determined by the dimensions of the cables for which they are intended. The maximum width of the tape is about equal to the circumference of the cable at the point where the tape is to be applied, and may vary from about 1 cm to a maximum of 15 cm. The thickness is preferably kept as small as possible. A possible maximum thickness is 1 mm, and a minimum value is in the order of 0.01 mm. These values apply, of course, in the situation in which the microcapsules are not expanded.

As stated before, water-swellable materials may be incorporated in the expandable tape according to the invention in addition to the thermally expandable microcapsules. Suitable water-swellable materials are, for example, Na of K polyacrylates, modified starch, CMC, MC, polyacrylamide.

It is also possible, if the carrier material consists of a synthetic plastics, to incorporate metal fibres into it to increase its conductivity.

In the preferred embodiment of the present invention, the contact between the tape and the source of heat, i.e. the extruded layer, is improved by providing the tape on one side with an amount of microcapsules of a different type from that applied to, or incorporated in, the tape elsewhere. The second type of microcapsules is characterized in that its expansion temperature is lower than the expansion temperature of the first type.

This makes it possible for the tape to be pre-expanded at a relatively low temperature, with the definitive expansion being effected when the sheath is applied. Pre-expansion can be effected by using, for example, the heat content of the petroleum jelly, which is often used for filling the core of a telecommunication cable. The temperature thereof is, for example, 80°-90° C. If, thereafter the tape is applied with the microcapsules expanding at lower temperature facing the cable core, the tape will tend to be pushed outwardly, even if there are grooves in the core, so that during the subsequent application of a sheath a good heat contact is obtained with it, which is needed for an efficient expansion of the other microcapsules present in or on the tape.

If desired, the tape can be pre-expanded by passing it over or through a heat source of suitable temperature just before it is applied around the cable.

Even when using a tape that can be expanded to greater thickness, it should be ensured during assembly that the side of the tape incorporating the microcapsules swelling at the higher temperature faces the heat source. If then, during the expansion of the tape, a temperature gradient occurs in the diametrical direction of the web, optimum expansion can yet be accomplished in this manner.

The application of the expandable tape according to the invention for the manufacture of communication and/or power cables can be similar to the application of the known water-swellable materials. At a suitable location in the production process, a disc is disposed with a sufficient length of expandable tape thereon, for example, 1000-2500 m, which tape is continuously unwound and folded around the cable by suitable means. This is effected preferably parallel to the longitudinal direction of the cable, but it is also possible for the tape to be diagonally wound around the cable, either contiguously, i.e., with the edges of adjacent windings just touching, or slightly overlapping each other, or in the form of two tapes, which are narrow relatively to the cable diameter, which are diagonally wound crosswise, so that the cable is sealed discontinuously.

In another embodiment of the invention, the thermally expandable tape is applied between two sheaths of a cable and subsequently thermally expanded to give the cable, for example, additional stiffness. This may be of advantage for cables which, during laying, are not pulled but pushed.

For the rest, the cable is manufactured in the usual manner, with the only requirement being that, at a given moment, sufficient heat is supplied to expand the microcapsules.

The invention accordingly also relates to the use of the expandable tape according to the invention for the manufacture of cables for communication or power transmission purposes, and also to a cable therefor, which comprises one or plurality of insulated or non-insulated conductors (including glass fibres), and one or more sheaths, said cable comprising between the outer or outermost sheath and the conductor or conductors at least one expandable tape according to the invention, whose microcapsules may be thermally expanded.

This cable according to the invention may be filled with hydrophobic filling mass on the basis of petrolate or of another material, such as silicones, non-vulcanized rubber or bitumen, but in another embodiment, the cable does not comprise hydrophobic filling mass, but instead a material which swells in water in or adjacent to the expandable tape.

The invention is illustrated in and by the following examples, which however are not intended to limit the invention in any way. All percentages and parts are by weight.

EXAMPLE I

A parallel-oriented fibrous web consisting of 25 g per $m^2$ polyester fibres of 1.5 dtex with a length of 40 mm and 15 g per $m^2$ polyacrylate binder is provided with a binder/microcapsules dispersion by means of impregnation on a foulard press. The capsules are thermally expandable. In dry solids, 20 g per $m^2$ is applied. The composition of the dispersion is given in the following table.

TABLE A

| | parts wet | % dry solids in raw material | parts dry | % applied after drying | applied $g/m^2$ |
|---|---|---|---|---|---|
| polyacrylate dispersion | 100 | 50 | 50 | 24.2 | 5 |
| PVDC copolymer microcapsules | 225 | 65 | 150 | 72.5 | 15 |
| phenol derivative wetting agent | 4 | 80 | 3.2 | 1.5 | 0.3 |
| acrylate thickener | 12 | 30 | 3.6 | 1.7 | 0.3 |
| water | 260 | | | | |

The material is dried at a temperature below the expansion temperature of the microcapsules and subsequently the material is calendered, in which the thickness of the material is reduced from 0.45 mm to 0.20 mm. This material is subsequently cut to the desired width, and the resulting "discs" of expandable tape can be used in telecommunication cables to overlie the core under an extruded inner sheath.

EXAMPLE II

A parallel-oriented fibrous web as described in Example I is provided with a thermally expandable material using foam cladding. A mixture composed as specified in Table B is foamed and painted onto the web through a slit.

TABLE B

| | parts wet | % dry solids in raw material | parts dry | % applied after drying | applied g/m² |
|---|---|---|---|---|---|
| acrylate dispersion | 100 | 50 | 50 | 20.4 | 4 |
| PVDC copolymer microcapsules | 225 | 65 | 150 | 61.2 | 12.2 |
| wetting agent on the basis of phenol derivative | 4 | 80 | 3.2 | 1.3 | 0.3 |
| acrylate thickener | 40 | 30 | 12 | 4.9 | 1 |
| foam stabilizer on the basis of ammonium stearate | 120 | 25 | 30 | 12.2 | 2.4 |
| water | 900 | | | | |

The mixture specified in Table B is expanded to produce a foam having a density of 200 g/l. 20 g per m² of dry solids is applied. The material is dried at a temperature below the temperature at which the microcapsules begin to expand. During the production, a layer of sodium polyacrylate powder, with a particle size of 80–150 μm, is applied to this material in a proportion of 20 g per m². This powder absorbs water in a quantity of 500–1000 times its own weight. The resulting tape is calendered, as described in Example I, to a thickness of 0.20 mm. After being cut to the desired width, this material is used for the manufacture of a communication cable, in which the material is applied between the polyester film and the aluminium screen.

EXAMPLE III

A parallel-oriented fibrous web as described in Example I is impregnated with a binder dispersion incorporating microcapsules and black. The composition of the dispersion is given in Table C.

TABLE C

| | parts wet | % dry solids in raw material | parts dry | % applied after drying | applied g/m² |
|---|---|---|---|---|---|
| polyacrylate dispersion | 100 | 50 | 50 | 17.7 | 7.8 |
| black dispersion | 300 | 25 | 75 | 26.6 | 11.7 |
| microcapsules on the basis of PVDC polymer | 225 | 65 | 150 | 53.2 | 23.4 |
| acrylate thickener | 12 | 30 | 3.6 | 1.3 | 0.6 |
| wetting agent on the basis of phenol derivative | 4 | 80 | 3.2 | 1.1 | 0.5 |

44 g per m² dry solids of the dispersion is applied to the web, whereafter it is processed further as described in Example I. Using this expandable tape, power cables are manufactured by incorporating it under the screen, and applying a conductive or non-conductive petrolate composition between the screen sieves.

EXAMPLE IV

A parallel-oriented fibrous web as described in Example I is printed with a regular pattern of a mixture of a very soft acrylate binder, which is sticky at room temperature, and a thermally expandable material. The composition of this mixture is given in Table D.

TABLE D

| | parts wet | % dry solids in raw material | parts dry | % applied after drying | applied g/m² |
|---|---|---|---|---|---|
| polyacrylate dispersion | 100 | 60 | 60 | 37.7 | 7.5 |
| microcapsules on the basis of PVDC copolymer | 150 | 65 | 97.5 | 61.3 | 12.3 |
| acrylate thickener | 5 | 30 | 1.5 | 1 | 0.2 |

20 g per m² of dry solids is applied to the web. To the treated fibrous web, sodium polyacrylate powder is applied with a particle size of 80–150 μm in a quantity of 20 g per m². The web is subsequently reduced in thickness to 0.20 mm by means of a calender. When the material has been cut to the correct width, it is used in a power cable by being wound over the screen and under the outer sheath.

EXAMPLE V

A parallel-oriented fibrous web consisting of 25 g/m² polyester fibres of 1.5 dtex and a length of 40 mm, and 15 g/m² polyacrylate binder is provided with a binder containing thermally expandable microcapsules, of type A (beginning expansion 89° C.) by impregnation on a foulard press. The composition of the dispersion is in accordance with Table A.

20.6 g/m² of dry solids is applied to the impregnated fibrous web. The material is dried at a temperature below the expansion temperature of microcapsules type A. This impregnated fibrous web is subsequently printed with a regular pattern of a mixture of an acrylate and a heat-expandable microcapsule type B (beginning expansion: 72° C.).

| | Composition of the mixture: | | | |
|---|---|---|---|---|
| | parts wet | % dry solids in raw material | parts dry | applied g/m² |
| Polyacrylate dispersion | 100 | 50 | 50 | 6.5 |
| PVDC copolymer microcapsules type B | 150 | 65 | 97.5 | 13 |
| Acrylate thickener | 5 | 30 | 1.5 | 0.2 |

19.7 g/m² of dry solids is applied to the web. Drying is effected at a temperature below the expansion temperature of microspheres type B. This material is longitudinally introduced into a telecommunication cable prior to filling with petroleum jelly.

EXAMPLE VI

A parallel-oriented fibrous web consisting of 25 g/m² polyester fibres of 1.5 dtex and 40 mm long, and 15 g/m² polyacrylate binder is provided, by impregnation on a foulard press, with a binder containing heat-expandable microcapsules of type A.

Composition of the Dispersion

| | Composition of the dispersion: | | | |
|---|---|---|---|---|
| | parts wet | % dry solids in raw material | parts dry | applied $g/m^2$ |
| Polyacrylate dispersion | 100 | 50 | 50 | 5 |
| PVDC copolymer microcapsules type A | 225 | 65 | 150 | 15 |
| phenol derivative wetting agent | 4 | 80 | 3.2 | 0.3 |
| acrylate thickener | 12 | 30 | 3.6 | 0.3 |
| water | 260 | | | |

20.6 $g/m^2$ of dry solids is applied. The material is dried at a temperature below the expansion temperature of microcapsules A. This impregnated fibrous web is provided with microcapsules type B by foam cladding. For this purpose a mixture composed as specified in Table B is expanded and painted onto the web through a slit.

The mixture indicated in Table B is expanded to a density of 200 g/l. 19.9 $g/m^2$ of dry solids is applied. The material is dried at a temperature below the expansion temperature of the microcapsules.

The characteristic feature of microcapsules B is that their expansion temperature is lower than that of microcapsules A. The difference in expansion temperature may be, for example, 5° to 20° C. This material can be longitudinally applied around a communication cable after filling the cable with petroleum jelly. The tape may also be passed via a heating element maintained at a suitable temperature to cause the microcapsules expanding at low temperature to expand.

We claim:

1. An expandable tape for use in the manufacture of cables comprising a carrier material carrying two types of thermally expandable microcapsules therein, which begin to expand at different temperatures, the difference in initial expansion temperature between the two types of microcapsules being at least 5° C.

2. An expandable tape as claimed in claim 1, characterized in that the two different types of micrographs are applied in different layers.

3. An expandable tape as claimed in claim 1, characterized in that the carrier material comprises a fibrous structure, an expanded synthetic plastics material, a film of synthetic plastics material, or a foil of metal or paper.

4. An expandable tape as claimed in claim 3, characterized in that the fibrous structure is a non-woven web.

5. An expandable tape as claimed in claim 3, wherein one type of said microcapsule is contained in the tape and the other type of microcapsule is applied to the tape.

6. An expandable tape as claimed in claim 1, characterized by a different type of microcapsule on each side of the carrier material.

7. An expandable tape as claimed in claim 1, wherein the microcapsules are applied in a solid field or as dots, lines, or figures in regular or random distribution.

8. An expandable tape as claimed in claim 1, characterized by further having applied to or impregnated in said expandable tape a material which swells in water.

9. The expandable tape as claimed in claim 1 for use in the manufacture of communication or power transmission cables.

10. A cable for communication or power transmission, comprising one or a plurality of insulated or non-insulated conductors and one or more sheaths, said cable comprising between the outer or outermost sheath and the conductor or conductors at least one expandable tape as claimed in claim 9, whose microcapsules are capable of being thermally expanded.

11. A cable as claimed in claim 10, characterized by being filled with a hydrophobic filling mass.

12. A cable as claimed in claim 11, characterized by further having applied to or impregnated in said expandable tape a material which swells in water.

* * * * *